Aug. 14, 1962 J. H. BERTIN ET AL 3,048,974
JET DEFLECTING DEVICE FOR JET PROPULSION UNITS
Filed April 21, 1953 5 Sheets-Sheet 1

INVENTORS
Jean H. Bertin
Marcel Kadosch
Henri Turinetti
Raymond H. Marchal
By Watson, Cole, Grindle & Watson
ATTORNEYS

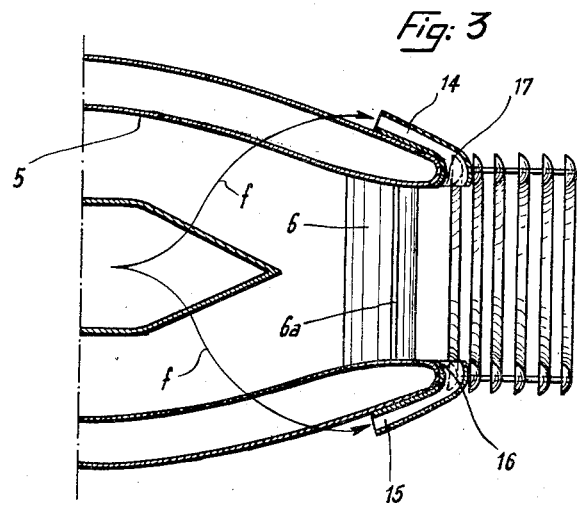
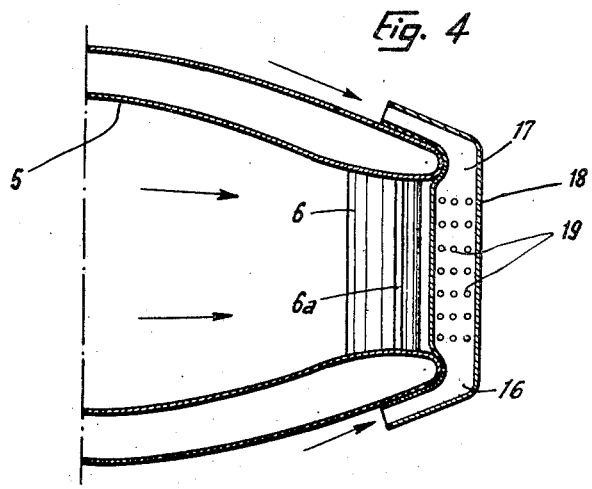

Aug. 14, 1962  J. H. BERTIN ET AL  3,048,974
JET DEFLECTING DEVICE FOR JET PROPULSION UNITS
Filed April 21, 1953  5 Sheets-Sheet 3

INVENTORS
Jean H. Bertin
Marcel Kadosch
Henri Turinetti
Raymond H. Marchal
By Watson, Cole, Grindle & Watson
ATTORNEYS Aug. 14, 1962   J. H. BERTIN ET AL   3,048,974
JET DEFLECTING DEVICE FOR JET PROPULSION UNITS
Filed April 21, 1953   5 Sheets-Sheet 4
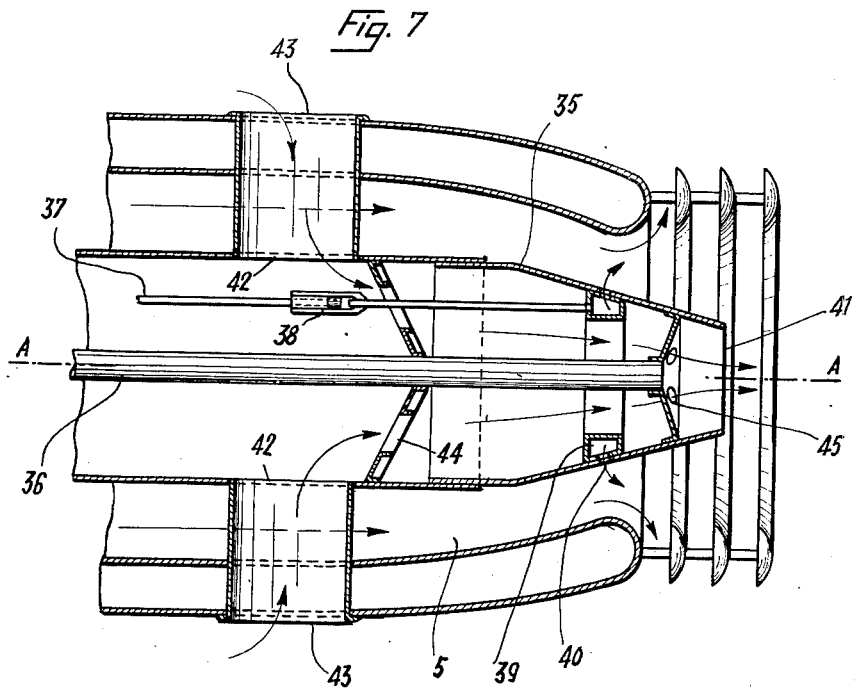
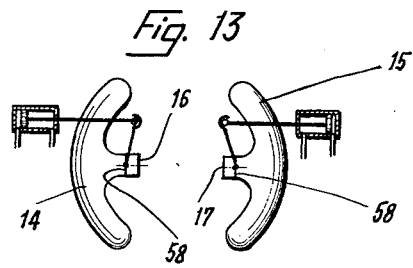
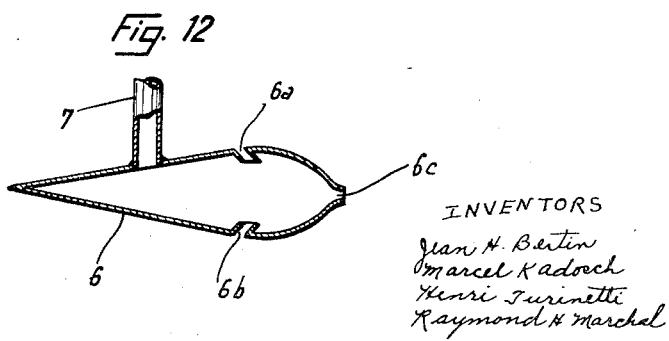
INVENTORS
Jean H. Bertin
Marcel Kadosch
Henri Turinetti
Raymond H. Marchal
By Watson Cole, Grindle &
Watson
ATTORNEYS

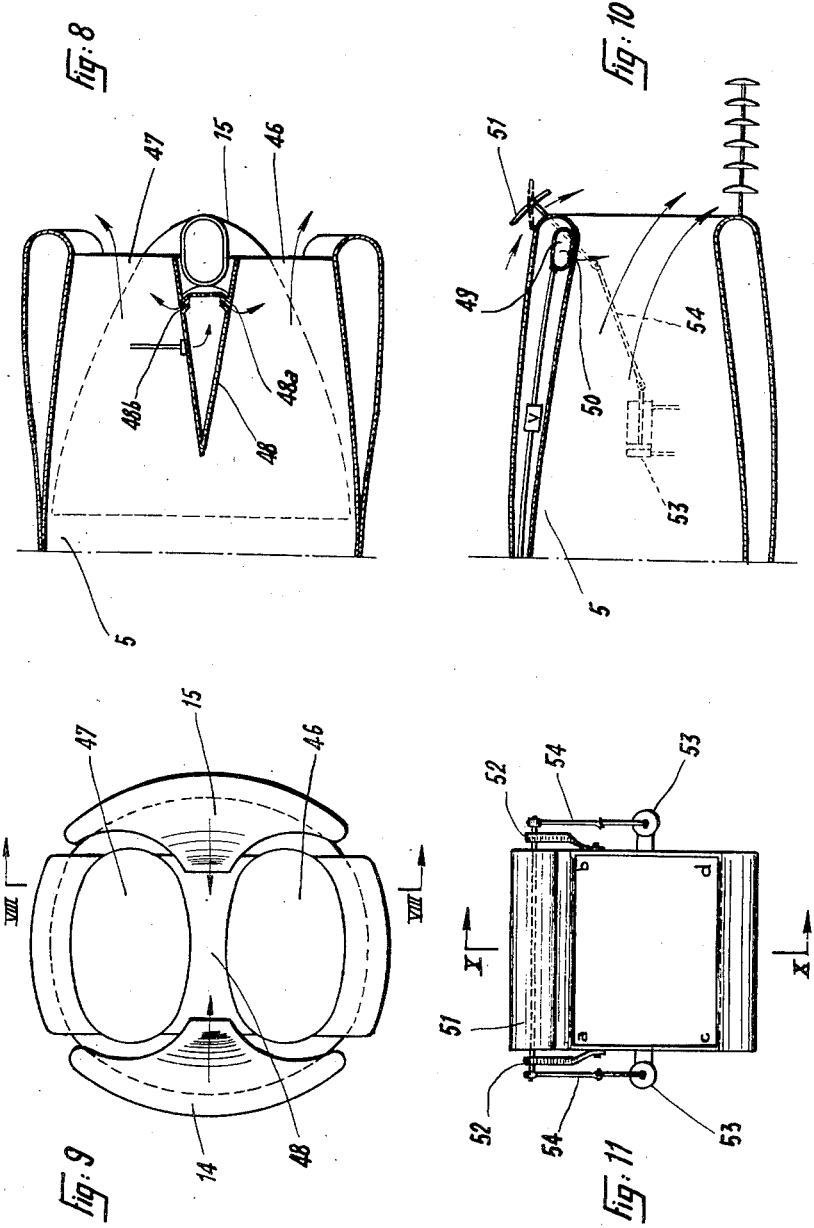

United States Patent Office 3,048,974
Patented Aug. 14, 1962

3,048,974
JET DEFLECTING DEVICE FOR JET
PROPULSION UNITS
Jean H. Bertin, Neuilly-sur-Seine, and Marcel Kadosch, Henri Turinetti, and Raymond H. Marchal, Paris, France, assignors to Societe Nationale d'Etude et de Construction de Moteurs d'Aviation, Paris, France, a French company
Filed Apr. 21, 1953, Ser. No. 350,171
Claims priority, application France Apr. 23, 1952
3 Claims. (Cl. 60—35.54)

In the U.S. Patent No. 2,702,986 dated March 1, 1955, and in the U.S. patent application Serial No. 229,772 filed June 4, 1951, now Patent No. 2,793,494, we have described arrangements for deflecting the propulsive jet issuing from the discharge nozzle of a jet propulsion unit.

These arrangements include a fluid or solid obstacle which can be put into operation so as to intercept some of the streamlines of the jet in order to initiate deflection thereof.

We have now found that the obstacle and the member on which it is supported give rise therebehind to a wake, that is to say to a zone of low pressure, and that a difficulty may arise from this cause in effecting the deflection of the jet, and in particular at the moment when it is wished to initiate this deflection.

The object of the present invention is to overcome this difficulty by filling with fluid the zone situated at the rear of the obstacle and its support where the low pressure tends to be produced, in such a way as to reduce the action of this low pressure on the streamlines of the jet which are to be deflected.

The description which follows below with reference to the attached drawings (which are given by way of example only and not in any sense of limitation) will make it quite clear how the invention can be carried into effect.

FIG. 3 is a partial view in horizontal section of the rear of the unit, on a slightly larger scale.

FIG. 4 is a view similar to FIG. 3 showing a modification of the arrangement for supplying fluid to the zone of low pressure.

FIG. 7 is a view in axial section of a discharge nozzle provided with another form of embodiment of the improvement in accordance with the invention.

FIG. 8 is a view in axial section of a double discharge nozzle which comprises an application of the invention.

FIG. 9 is an end view of this discharge nozzle.

FIG. 10 shows the application of the invention to a discharge nozzle in which the deflection is only effected towards one side.

FIG. 11 is an end view of this latter discharge nozzle.

FIG. 12 is concerned with an alterantive form of embodiment in which the filling of the wake is effected by a part of the fluid which serves to carry out the deflection.

FIG. 13 shows an arrangement for controlling the supply of gas to the low pressure zone.

Figure 1:
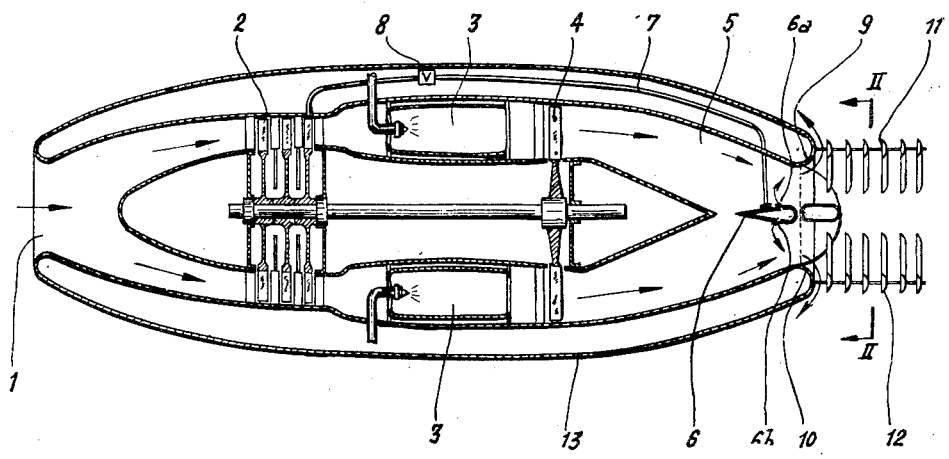
FIG. 1 is a diagrammatic view in axial cross-section of a turbo-jet unit provided with an arrangement for deflecting the jet, improved in accordance with the invention.

FIG. 1 shows a turbojet unit comprising a frontal air inlet 1, an air compressor 2, a combustion chamber 3, a gas turbine 4 which drives the compressor, and a discharge nozzle 5 which supplies the propulsive jet.

In the plane of the diameter of the exhaust nozzle, there is arranged a fair-shaped member 6 which only occupies a very small portion of the cross-section area of the nozzle. This member is hollow and its internal space can be supplied through a piping system 7, with compressed air tapped from the compressor 2 when the valve 8 is opened. The member 6 is provided with two parallel slots 6a—6b which face the two halves of the discharge nozzle separated by the said member and which are preferably inclined upstream so that the layers of air which are discharged through the slots when the valve 8 is opened, have a velocity component which is directed opposite to the flow direction of the jet. The said layers of air thus form two obstacles which intercept part of the jet and deflect the two halves of the fluid jet, separated by the member 6, along the convex tangential edges 9, 10 at the end of the discharge nozzle 5. Sets of vanes 11, 12 which are arranged parallel to the edges 9 and 10 are designed to guide the portions of the jet which are at a distance from the rounded edges 9, 10 and to cause them to follow the desired path of deflection. By giving a suitable shape to the rounded edges 9, 10 and the vanes 11, 12 and by suitably controlling the pressure of the auxiliairy deflecting jets expelled from the slots 6a—6b, it is possible to reverse the jet towards the front of the unit so that it will give a negative thrust producing a braking effect.

The difficulty which has been referred to in the preamble of the present description arises from the fact that the intercepting obstacles which in the present case are the fluid screens formed by the blowing slots 6a—6b, require a supprt member 6 which creates therebehind a wake zone in spite of the fact it is fair-shaped.

It has been endeavored to reduce this wake as far as possible during periods when the jet is being deflected, by choosing a suitable profile for the member 6, in order to avoid loss of thrust. However, when the obstacles which, in the case considered, are gaseous, are formed by the auxiliary jets expelled from the slots 6a—6b, the wake on the delivery side of these obstacles increases and the zone of low pressure which thus obtains has the effect of sucking up fluid flowing in its immediate vicinity. In order to improve the operation of the deflecting device, it is important to prevent the deflected streamlines of the jet from being urged back into this low pressure zone.

It may be seen from the drawings that, when the deflection has been initiated, the jet, which is divided into two halves which are laterally guided by the sets of vanes 11 and 12, leaves between these two portions a space into which atmospheric air may pass from the rear towards the front in order to fill the wake created by the deflecting obstacles. However, at the beginning of the deflection, this is not the case and the low pressure which then obtains on the downstream side of the deflecting device is liable to act in opposition to the deflection by sucking up the streamlines of the jet.

Figure 2:
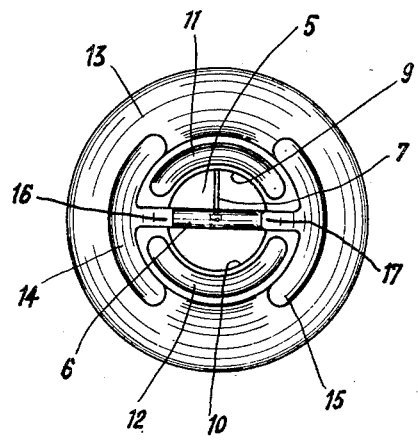
FIG. 2 is a view of the reactor unit looked at from the rear from the left side of the plane II—II.

In the embodiment of the invention shown in FIGS. 1 to 3, this difficulty is overcome by supplying atmospheric air obtained from the sides of the cowling 13 of the unit to the zone of low pressure located on the downstream side of the member 6. This air passes in through wind scoops 14—15 which are of flattened shape and extend over a substantial arc around the nozzle. These scoops have inlet openings facing forwardly and outlet openings 16—17 at opposite ends of the zone of low pressure located on the downstream side of the member 6. They are permanently in operation to supply the wake zone with air, both during the normal operation of the unit and during the periods when the jet is deflected. The air delivered by these scoops provides from the ambient atmosphere and its flow depends on the velocity of the aircraft. It is therefore no longer necessary to give a streamlined profile to the downstream portion of the member 6. On the contrary, this portion may be given an abrupt end, as short as possible, giving rise to a relatively wide wake which facilitates the separation of the two halves of the jet when the obstacle is put in operation. In the drawings, the rear end of the member 6 has a profile in the shape of a semi-circle but any other shape may be used, for example a flat shape.

In addition, it is to be noted that the ambient air which, because of the motion of the aircraft relatively thereto, has a dynamic pressure hindering the formation of the deflected jet, is partly urged towards the wind scoops 14—15 as indicated by the arrows f of FIG. 3 and collected thereby. This partial elimination of the action of the ambient air promotes the deflection of the jet by the sets of vanes 11—12.

In order to supply air to the very center of the zone of low pressure, the outlet openings 16—17 of the wind scoops may be extended or again these openings may be caused to discharge into a chamber 18 arranged in the space occupied by the wake at the rear of the member 6 and provided with a large number of holes 19 (see FIG. 4).

In the foregoing embodiment, the intercepting means considered is of the type in which the obstacles extends across the whole path of the jet, and it divides the same into two parts.

Figure 5:
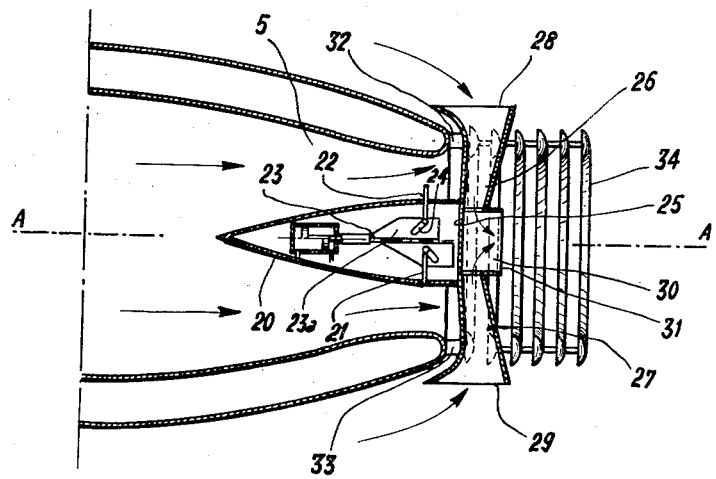
FIGS. 5 and 6 are views in axial section and also of the end of a discharge nozzle of a jet propulsion unit, improved in accordance with the invention in another form of embodiment.
Figure 6:
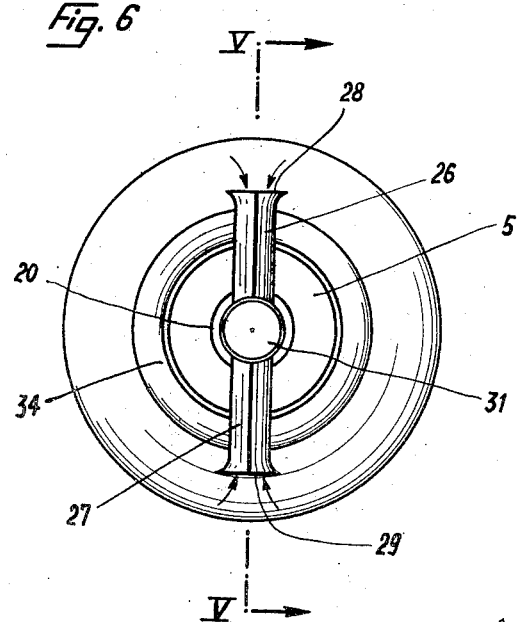

FIGS. 5 and 6 on the one hand and FIG. 7 on the other hand, relate respectively to two other embodiments which are applicable to another kind of intercepting means in which the obstacle is located in a space which is entirely surrounded by the jet. The intercepting means is disposed on a central body of circular cross-section and coaxial with the nozzle 5.

In the embodiment of FIGS. 5 and 6, the discharge nozzle 5, which has a shape of revolution around the axis A—A, comprises on that axis a body 20, having the shape of a hollow needle and carrying the deflecting obstacle. In the case under consideration, this obstacle is supposed to be made up of segments of flat rings 21—22 which are adapted to slide radially in the slots of the body 20 in such a way as to be either completely withdrawn into the interior of this body (see the lower half of FIG. 5), or to form a projection from the surface of the said body (see the upper half of FIG. 5) in order to cause deflection of the jet. The sliding movement of these rings is assumed to be controlled by a member 23 sliding in the axis and including flat flanges 23a provided with inclined slots 24 which co-operate respectively with fingers on the segments 21—22. There may be, for example, four segments mounted consecutively in a row and each one covering an angle of 90° so that these segments, taken together, occupy the circumference of the body 20. The member 23 will then comprise four flat flanges 23a mounted at 90° from each other, and each carrying an inclined slot 24 which cooperates with the finger of the corresponding segment.

The body 20 which tapers towards the front, ends at the rear with an abrupt surface 25 giving rise to a considerable wake. This wake is supplied with air by means of two air scoops 26, 27 which extend radially of the nozzle and open to the atmosphere at 28, 29. Air arriving in these scoops at 28, 29 passes into a sort of box 30 which is fully open to the delivery side at 31. The scoops 26, 27 are fair-shaped in cross-section so as to present the minimum resistance to the normal flow of the jet. They are fixed by means of strut members 32, 33 to the convex rear edges of the discharge nozzle. They may thus serve to support the body 20 as well as the set of circular vanes 34.

In the alternative embodiment shown in FIG. 7, the invention is assumed to be applied to a discharge nozzle of annular form, provided in its central portion, with a sliding cone 35, the displacement of which, parallel to the axis A—A for the control of the cross-section of the discharge nozzle, is effected by a rod 36 and a servomotor, not shown. The deflection of the jet is effected by compressed air tapped from the air compressor through a tube 37 (having a sliding joint 38) which leads to a circular chamber 39 having an annular slot 40 designed for forming the auxiliary fluid-intercepting air jet. The interior of the cone 35 is hollow and is freely open to the rear at 41. It is provided laterally with holes 42 connected with air scoops 43 opening to the atmosphere on the external side of the cowling and extending radially through the annular discharge nozzle 5. By this means, the zone of low pressure, which is located at the rear of the cone 41, is supplied with atmospheric air from the air scoops 43, the orifices 42, the interior cone and the rear orifice 41. Of course, any support strut existing in the cone, is provided with suitable orifices such as 44 and 45 for the passage of air.

FIGS. 8 and 9 have reference to an embodiment of the invention which is applicable to a particular type of discharge nozzle which has been developed quite recently and which consists of two separate outlet orifices 46, 47 connected to the discharge pipe 5.

The space between these two orifices can be arranged in such a way as to form a chamber 48 connected to the air compressor and each of the orifices is associated with a slot 48a, 48b. If the two orifices are, for example, superposed, it will be seen that with this arrangement the jet from the upper orifice is deflected towards the top and the jet from the lower orifice towards the bottom.

The wake zone located between these two orifices at the rear of the chamber 48, is supplied with air taken from the exterior of the cowling of the unit by two air scoops 14 and 15 similar to those which have already been described with reference to FIGS. 1 to 3.

FIGS. 10 and 11 are relative to the case in which the deflection is made towards only one side of the discharge nozzle. The discharge nozzle shown in the drawing has a rectangular outlet orifice a—b—c—d and it is desired to be able to deflect the jet along the lower edge c—d. A pressure chamber supplied by air taken from the compressor is arranged at 49 along the upper edge a—b and is provided with a blowing slot 50 running parallel to the said edge inside the exhaust nozzle. The wake which tends to be produced at the rear of the upper edge at the moment when deflection takes place, is supplied with air by means of a small deflector 51 which leads in atmospheric air. At periods when deflection is not taking place, this deflector can be retracted as shown in dotted lines, for example by pivoting about axles 52. There have been shown, by way of example, two hydraulic rams 53 which act on levers 54 which form part of these axles.

Instead of using atmospheric air at the moment at which the deflection is begun, the zone of low pressure can be filled with air tapped from the unit; and in particular from the compressor.

FIG. 12 shows a portion of one form of embodiment of this kind, which is assumed to be applied to an apparatus of the type shown in FIG. 1. The diametrical member 6, provided with blowing slots 6a—6b comprises, in addition, at its rear end, a slot 6c or a series of holes through which the compressed air issues in order to fill the zone of low pressure. In this case, the air scoops 14 and 15 may be done without.

FIG. 13 shows a modification wherein the air scoops of the arrangement of FIGS. 1 to 3, is provided with butterfly valves 58 which allow cutting off the supply of atmospheric air to the zone of low pressure.

This affords a protection against the possibility of accidental operation of the deflecting arrangement as well as a control of the deflection.

What we claim is:

1. In a jet propulsion unit having a propulsive nozzle designed to form a thrust-providing jet parallel to the axis of said nozzle, a jet deflecting device comprising the combination of controllable means for temporarily projecting a partial obstacle crosswise of said nozzle thereby deflecting said jet from said axis, and of means for leading ambient air to the rear of said obstacle in the midst of said jet.

2. The combination of claim 1 wherein the air is introduced in a substantially transverse direction with respect to the jet.

3. In a jet propulsion unit having a generally cylindrical propulsion nozzle forming a gaseous jet directed axially of said nozzle, a jet deflecting device disposed in and extending diametrically across the interior of said nozzle and dividing the jet into two outflowing halves, means for emitting gaseous jets in diametrically opposite directions from said deflecting device to cause divergence of said jet halves in said opposite directions away from said device, and air-introducing means carried by said nozzle immediately downstream of diametrically opposite ends of said device for injecting air diametrically inwardly toward the axis of said nozzle and thus between said outflowing jet halves.

References Cited in the file of this patent

UNITED STATES PATENTS

| | | |
|---|---|---|
| 2,408,788 | Ludington et al. | Oct. 8, 1946 |
| 2,483,401 | Cole | Oct. 4, 1949 |
| 2,526,510 | Smith | Oct. 17, 1950 |
| 2,620,622 | Lundberg | Dec. 9, 1952 |
| 2,620,623 | Imbert | Dec. 9, 1952 |
| 2,637,164 | Robson et al. | May 5, 1953 |
| 2,639,579 | Willgoos | May 26, 1953 |
| 2,654,552 | Jonas | Oct. 6, 1953 |

FOREIGN PATENTS

| | | |
|---|---|---|
| 503,064 | Belgium | May 31, 1951 |